United States Patent [19]

Hagle

[11] Patent Number: 5,074,748
[45] Date of Patent: Dec. 24, 1991

[54] SEAL ASSEMBLY FOR SEGMENTED TURBINE ENGINE STRUCTURES

[75] Inventor: Michael P. Hagle, Mason, Ohio

[73] Assignee: General Electric Company, Cincinnati, Ohio

[21] Appl. No.: 560,536

[22] Filed: Jul. 30, 1990

[51] Int. Cl.$^5$ .................. F03B 11/00; F04D 29/08
[52] U.S. Cl. .................. 415/170.1; 277/53; 277/138
[58] Field of Search ........... 277/53, 138; 415/168.2, 415/173.5, 173.6, 174.5, 170.1, 139; 29/888.3; 405/147; 49/475

[56] References Cited

U.S. PATENT DOCUMENTS

| Re. 30,206 | 2/1980 | Ferguson et al. | 415/174 |
|---|---|---|---|
| 2,997,275 | 8/1961 | Bean et al. | 415/135 |
| 3,720,045 | 3/1973 | Murphy | 415/173.6 X |
| 3,752,598 | 8/1973 | Bowers et al. | 415/139 X |
| 3,917,150 | 11/1975 | Ferguson et al. | 228/159 |
| 3,986,789 | 10/1976 | Pask | 415/178 |
| 4,265,455 | 5/1981 | Lundgren | 277/53 |
| 4,269,420 | 5/1981 | Persson | 277/53 |
| 4,415,309 | 11/1983 | Atterbury | 415/170 R |
| 4,537,024 | 8/1985 | Grosjean | 415/139 X |
| 4,648,792 | 3/1987 | Baran, Jr. et al. | 415/139 |
| 4,755,103 | 7/1988 | Streifinger | 415/111 |
| 4,756,153 | 7/1988 | Roberts et al. | 415/139 X |
| 4,756,536 | 7/1988 | Belcher | 277/53 |
| 4,781,388 | 11/1988 | Wohrl et al. | 277/53 |
| 4,809,990 | 3/1989 | Merz | 277/53 |

Primary Examiner—William A. Cuchlinski, Jr.
Assistant Examiner—J. K. Folker
Attorney, Agent, or Firm—Jerome C. Squillaro

[57] ABSTRACT

A relatively stationary segmented turbine engine shroud, nozzle or frame assembly is sealed against the passage of cooling air into the exhaust gas flowpath by a plurality of spline seals which cooperate with an annular stationary brush seal. The spline seals provide sealing between axially extending confronting edges of adjacent segments while the brush seal provides continuous circumferential sealing around the segments and spline seals.

14 Claims, 3 Drawing Sheets

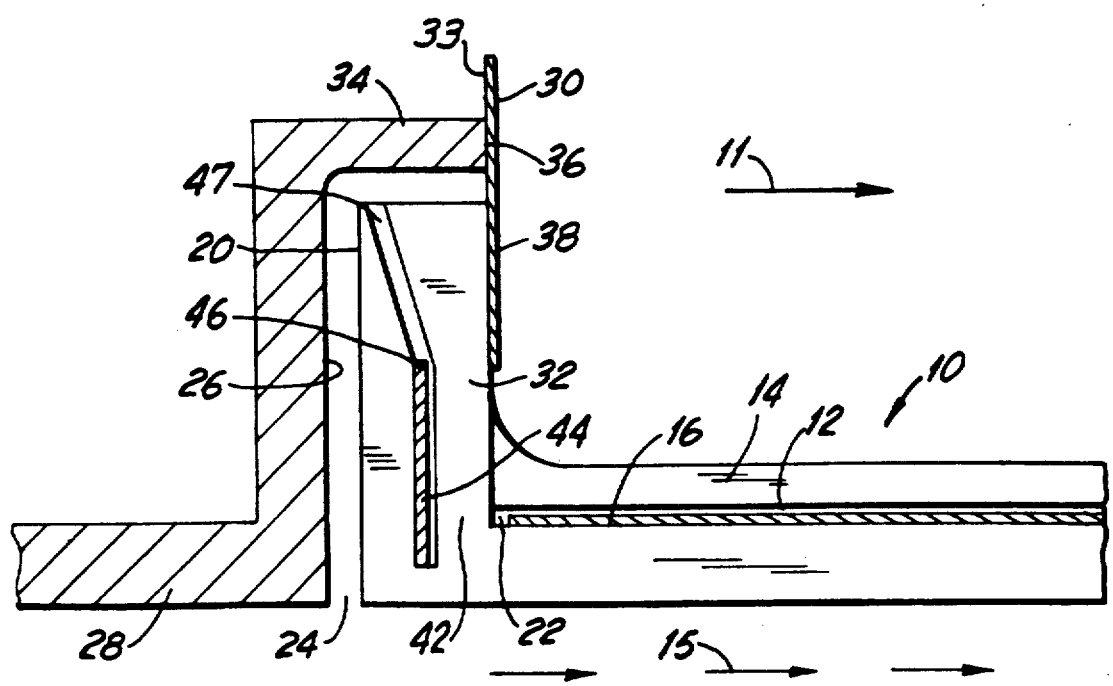
PRIOR ART
FIG.1
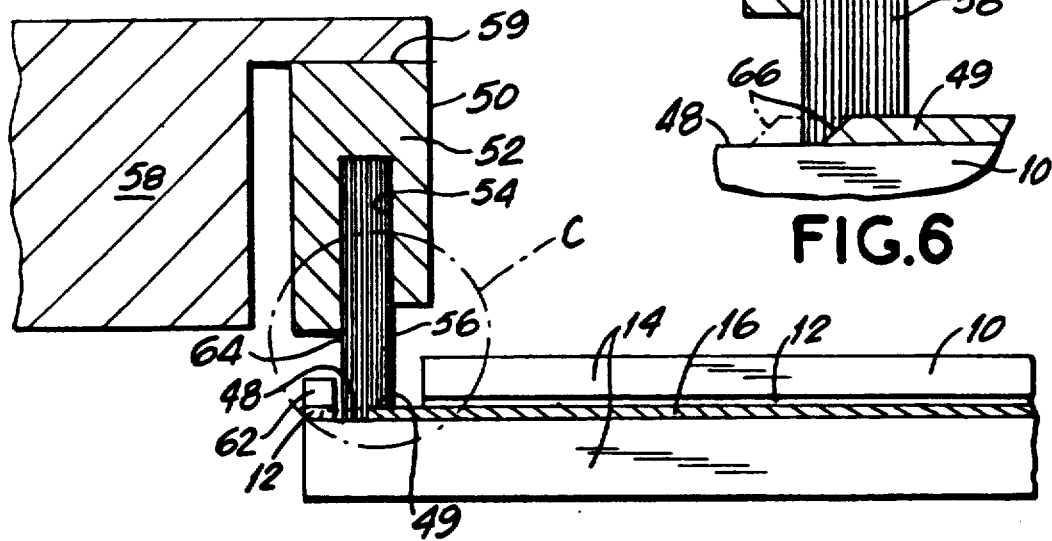
FIG.6
FIG.2

SEAL ASSEMBLY FOR SEGMENTED TURBINE ENGINE STRUCTURES

BACKGROUND OF THE INVENTION

1. Field of the Invention

The present invention relates in general to the elimination of cooling air leakage paths adjacent and through a segmented turbine engine assembly and particularly relates to a combination brush and spline seal assembly for use with an annular segmented turbine engine shroud, nozzle and/or an adjoining annular turbine engine frame.

2. Description of Prior Developments

Turbine engine shrouds and nozzles are mounted within gas turbine engine frames to provide a generally cylindrical or frustoconical surface which defines an annular flowpath through which hot flowing exhaust gasses are directed. Because of the large temperature differentials and the large resultant thermal stresses and strains which are encountered during engine cycling, the annular turbine shrouds and adjoining nozzles are often constructed from a plurality of individual spaced-apart arcuate segments.

Circumferentially-extending gaps or clearances are provided between the confronting axially-extending end faces or side edges of each adjoining shroud and nozzle segment to accommodate circumferentially directed thermal expansion and contraction. Additional clearances are typically provided between the radially extending arcuate end faces located at the axial ends of each shroud and nozzle segment and the adjoining turbine frame members to accommodate axially directed thermal expansion.

The shroud and nozzle segments are typically cooled with pressurized cooling air which bypasses the turbine engine combustor. In order to maintain high turbine engine efficiency, it is important to prevent the cooling air from leaking through clearance gaps located between adjoining shroud and nozzle segments. Cooling air which leaks through these segments enters the exhaust gas flowpath and dilutes the hot flowing gasses thereby adversely affecting engine performance. In order to prevent such leakage, prior segmented shroud and/or nozzle designs relied upon various combinations of axial and radial spline seals, axial spline seals and radial leaf seals and axial spline seals and face seals known as chordal seals.

Unfortunately, no matter how these seals were arranged, some form of cooling air leakage path existed. Because turbine engine performance is improved with better cooling air sealing, a need exists for a sealing assembly which minimizes or eliminates the cooling air leakage associated with conventional seals used between gas turbine nozzle and shroud segments.

SUMMARY OF THE INVENTION

The present invention has been developed to fulfill the needs noted above and therefore has as a primary object the provision of a brush and spline seal assembly which eliminates the gaps and clearances previously provided at the end corners of segmented gas turbine nozzle and shroud segments.

Another object of the invention is to reduce the current machining of segmented turbine engine nozzles and shrouds which is presently required for sealing engagement with conventional leaf seals. This object is met by providing an as cast sealing surface for engaging a compliant brush seal which in turn engages a spline seal.

Another object of the invention is to either eliminate the need for leaf seals and/or chordal seals or to augment their performance by using the combined brush and spline seal assembly of the present invention.

Still another object of the invention is to use a brush seal for sealing between a pair of static turbine engine components.

Briefly, the present invention is directed to a continuous 360° annular brush seal which cooperates with a plurality of circumferentially spaced spline seals to minimize or eliminate cooling air leakage paths between adjoining components of a segmented turbine engine nozzle or shroud. An arcuate sealing surface is formed on each segment to define an annular segmented sealing surface for engaging the bristles of the brush seal. Each spline seal which provides partial sealing between adjoining nozzle and/or shroud segments is arranged to extend at least partially over the sealing surface of each segment so as to be in direct sealing engagement with at least a portion of the brush seal bristles.

Because of the compliant nature of the brush seal bristles, the spline seals may thermally expand and contract in all directions beneath the brush seal while maintaining resilient biased sealing contact therewith at all times. Moreover, because of the relatively thick sealing width of the brush seal, the bristles maintain sealing contact along a significant axial extent of the segments and/or spline seals. Thus, the spline seals may axially expand and contract over a relatively large axial range while maintaining sealing contact with the bristles.

Sealing performance may be enhanced by tapering the leading edges of the spline seals which engage the bristles so as to provide a smooth transition as the tapered leading edges effect a wedging action under the tips of the bristles during thermal contraction and expansion. Another aid to improved sealing capability may be incorporated within each turbine engine segment in the form of a raised lip located adjacent each brush seal for providing axial support to the bristles.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIG. 1 is a fragmental schematic axially sectioned side elevation view of various prior art turbine engine sealing arrangements for use with an annular segmented turbine engine assembly such as a turbine engine segmented shroud or segmented turbine nozzle;

FIG. 2 is a fragmental schematic axially sectioned side elevation view of one segment of a segmented turbine engine assembly such as a turbine engine shroud or nozzle provided with a spline and brush seal assembly according to the present invention;

FIG. 6 is an enlarged view of region C identified in FIG. 2.

In the various figures of the drawing, like reference characters designate like parts.

DESCRIPTION OF THE PREFERRED EMBODIMENT

In order to better appreciate the problems solved by the present invention, it is useful to review the prior art sealing arrangements shown in FIG. 1. As seen in FIG. 1, one segment 10 of a segmented annular turbine engine assembly is provided with a circumferentially and axially-extending slot 12 formed in an axially extending side or edge face 14 of the segment. A plurality of arcuate segments 10 is typically arranged in a circumferentially-spaced array in a known fashion to form a segmented turbine engine shroud or a segmented turbine engine nozzle.

Figure 4:
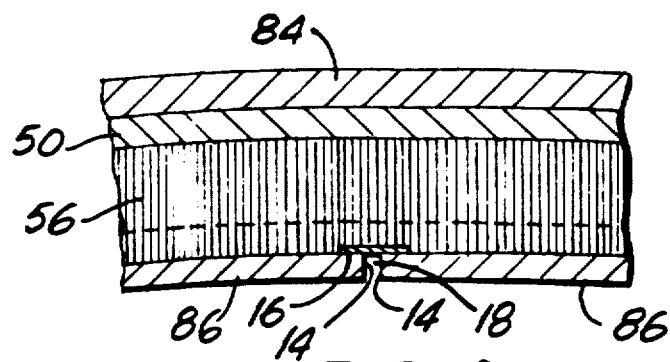
FIG. 4 is a sectional view taken along line B-B of FIG. 5.

In order to seal the axially extending gaps between the spaced-apart confronting edge faces 14 of adjoining segments so as to prevent leakage of cooling air 11 into exhaust gas flowpath 15, an axially-extending spline seal 16 is arranged within slot 12 in each segment 10 to circumferentially span and seal the gap provided therebetween. This general arrangement of spline seals is best seen in FIG. 4 wherein spline seal 16 bridges gap 18 formed between adjoining segments 86 which are analogous to segments 10 in FIG. 1.

A typical spline seal is formed from a thin flat strip of metal having a thickness of about 0.008 to 0.012 inch. While spline seal 16 extends over most of the axial extent of segment 10, it terminates slightly short of the radially extending arcuate end face 20 at segment corner portion 22. The spline seal axially abuts corner portion 22 at the end of slot 12 and is thereby axially retained within the slot. This retention method requires the spline length to be less than the axial length of the segment edge face 14 and thus creates a passage or opening through which cooling air may flow.

An additional axial gap 24 is formed between the end face 20 of each segment 10 and the end face 26 of an axially adjoining annular turbine frame member 28. In order to seal across the axial gap 24, resilient annular leaf seals 30 have been mounted to radial flanges 32 formed on each segment 10. An axially extending 360° lip 34 projects from the frame member 28 to provide biased sealing engagement against the confronting face 33 of the leaf seal. Both the sealing face 36 of lip 34 and the leaf seal mounting surface 38 on each flange 32 must be carefully machined to ensure proper sealing.

An alternate sealing arrangement for sealing the circumferential gaps 24 is the chordal seal. The chordal seal is a chord edge machined on the end face 20 of the segment 10. The segment is then forced against the adjacent part 28 to create line sealing contact. The leak path 42 exists with the chordal seal.

With either of the sealing arrangements noted above, a cooling air leak path 42 is formed at the corner portion 22 of each segment 10, thereby allowing cooling air 11 to bleed radially inwardly between the segments 10 into the exhaust gas flowpath 15. Although leak path 42 can be reduced by providing radially and circumferentially directed spline seals 44 within circumferential slots 46 formed in each radial flange 32 and/or corner portion 22 of each segment 10, a gap or leak path 42 of about, for example, 0.060 inch long by about 0.035 inch wide remains. Even if the radial spline seals 44 were designed to virtually abut the axially extending spline seals 16, leakage of cooling air would still occur during relative thermal expansions and contractions between these seals.

Both the axially extending spline seals 16 and the radial spline seals 44 may be axially restrained by the geometry of their respective slots 12, 46. Each spline seal may be elastically deformed during entry into an angled slot portion such as slot portion 47 which communicates with slot 46. Thus, once the radial spline seal 44 passes through slot portion 47 and straightens out, the slot geometry prevents liberation of the radial spline seal from slot 46. A similar arrangement may be used for restraining the axially-extending spline seals 16.

The sealing assembly of FIGS. 2 through 6 has been designed for a segmented turbine structure in order to eliminate leak paths 42 noted above. As shown in FIG. 2, each segment 10 is provided with a spline seal 16 such as described above, however, each slot 12 communicates with or breaks out onto an exposed circumferential arcuate sealing surface 48 provided over one or both axial end portions of each segment. Each spline seal 16 is dimensioned to extend over at least a portion of surface 48 so as to expose its axial end portion 49 for sealing engagement with a brush seal 50.

Brush seal 50 includes a continuous, one-piece, 360° annular casing 52 formed of metal or other suitable high temperature material. This one piece construction reduces the number of parts required for this sealing application. Casing 52 is provided with an annular channel 54 within which a plurality of metallic, ceramic or other high temperature bristles 56 are securely clamped and/or bonded. Casing 52 is dimensioned to form a tight seal within and against an adjoining static frame element 58 along the outer circumference 59 of casing 52.

Brush seal 50 is mounted within frame element 58 so that the compliant bristles 56 are biased against at least a portion of the exposed radially outer surface portion of end portion 49 of spline seal 16 thereby eliminating the gap or leak path 42 which existed in prior designs. The radial length of the bristles is dimensioned to provide moderate yet substantially air tight sealing contact against sealing surface 48. It should be noted that the end portion 49 of the spline seal 16 may axially extend completely across sealing surface 48 as shown in phantom so that all of the bristles 56 seal against the exposed end portion of the spline seal. Alternatively, the spline seal 16 may axially extend only partially across the sealing surface 48 as further seen in FIG. 2 so that some of the bristles 56 resiliently engage the spline seal while the remaining bristles engage sealing surface 48.

Because of the compliant biased engagement of the spline seal bristles with spline seal 16 and sealing surface 48, special machining of surface 48 is not required. Thus, sealing surface 48 may be an as cast surface. The resilient contact between the bristles and the spline seal also effectively accommodates thermal growth variations between the segments 10 and the frame element 58 so as to maintain effective sealing contact at all times. While FIG. 2 depicts a spline and brush sealing assembly at one end of segment 10, an identical or similar sealing assembly may be provided at both ends of segment 10 such as shown in FIG. 3.

Axial support may be provided to the brush seal bristles 56 by forming a raised annular lip or annular radial flange 62 on the low pressure side 64 of the bristles. Flange 62 thus serves to limit or prevent the axial deflection of the bristles past flange 62. Moreover, engagement of bristles 56 with flange 62 provides additional sealing engagement between the segments and the brush seal 50.

Because the spline seal 16 may move axially beneath the bristles 56 during thermal cycling, the tip or axial end face of exposed portion 49 of spline seal 16 may be tapered in the form of a wedge 66 as shown in FIG. 6 to prevent damage or wear of the bristles. As noted previously, the entire sealing assembly including frame element 58, unitary brush seal 50 and segment 10 is a static assembly with no relatively moving parts other than movement attributed to thermal growth. Prior applications for brush seals typically involved relatively rotating parts in contrast with the subject static sealing assembly.

Figure 3:
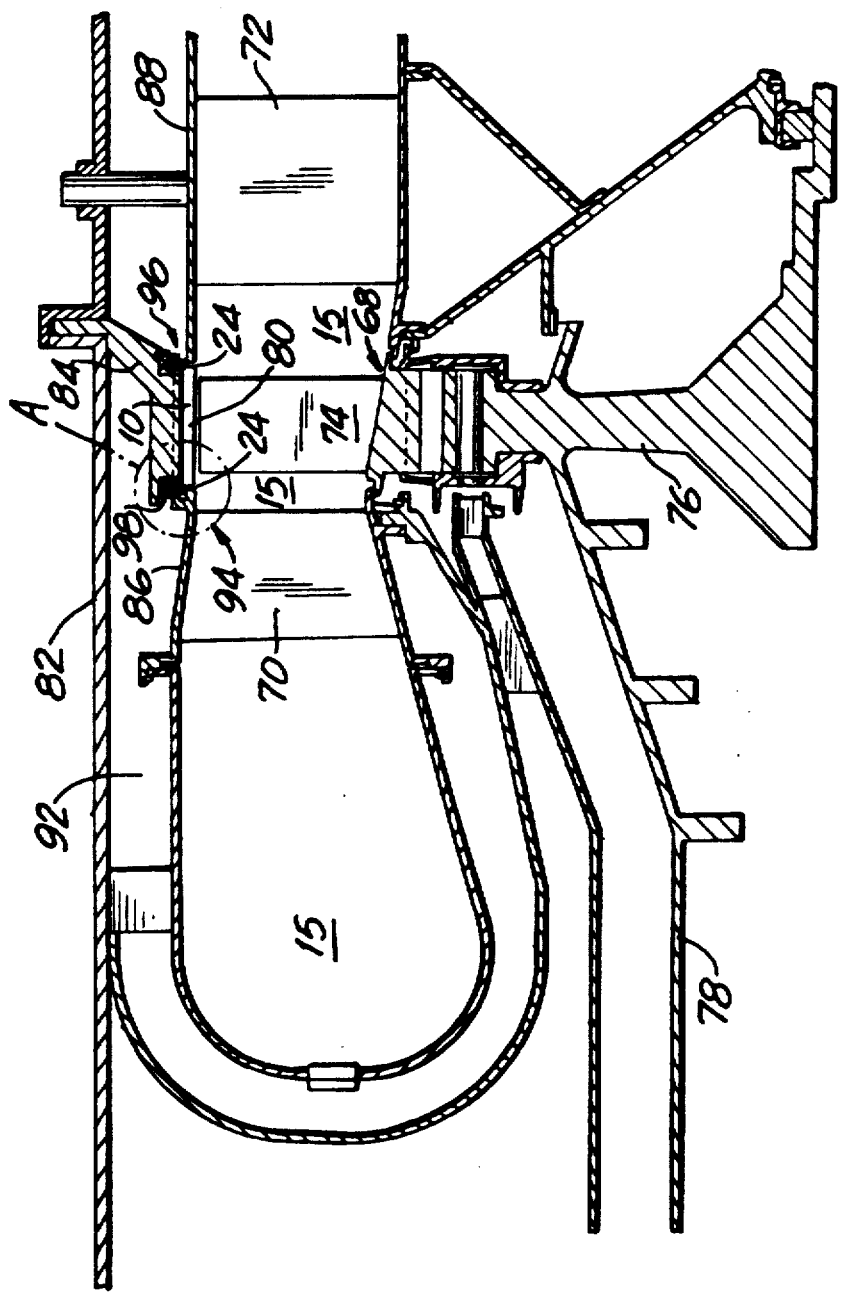
FIG. 3 is a fragmental axially sectioned view taken through a gas turbine engine provided with a spline and brush seal assembly according to the present invention.
Figure 5:
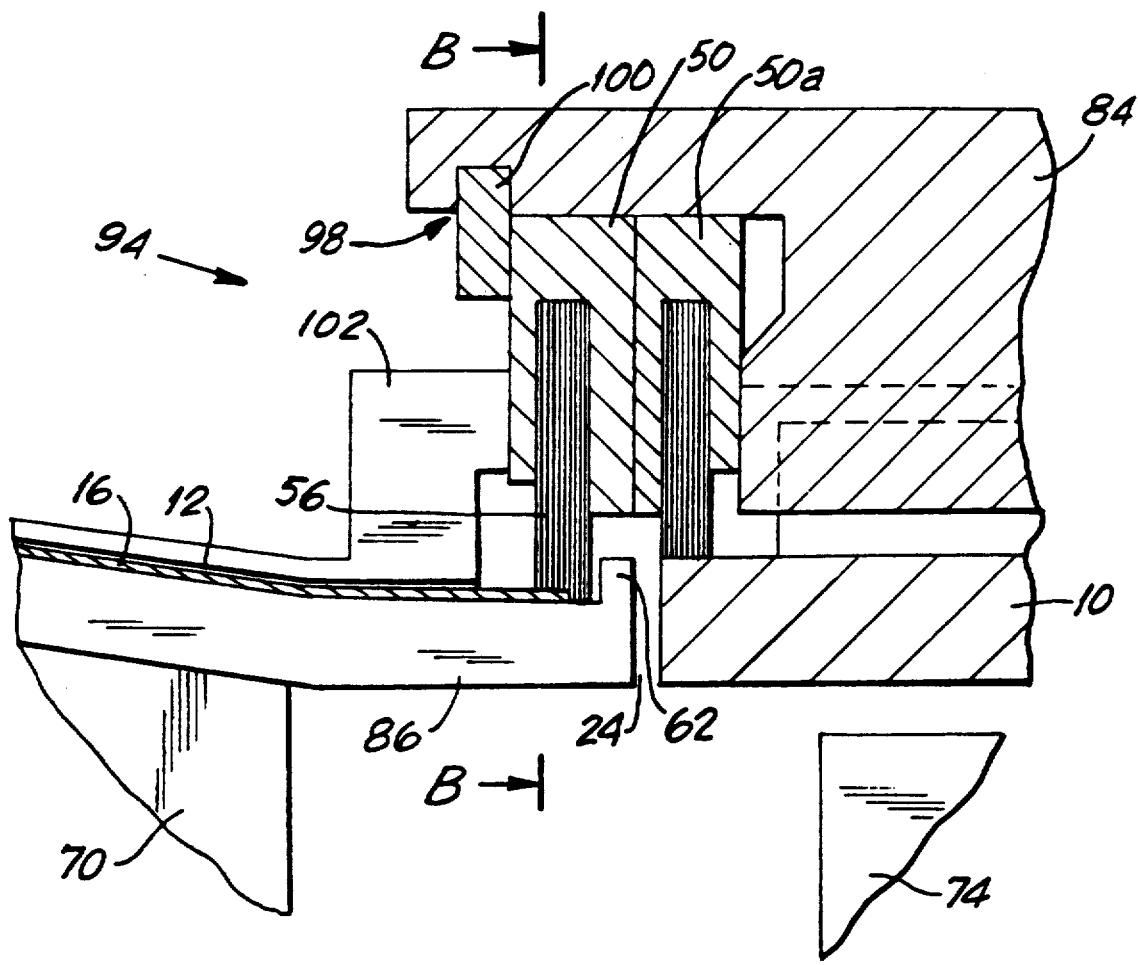
FIG. 5 is an enlarged view of region A identified in FIG. 3.

Although the sealing assembly of the present invention may be used with any annular or tubular segmented turbine frame construction, it is particularly suited for use with a segmented turbine shroud assembly and segmented stator assembly such as shown in FIGS. 3 through 5. As seen in FIG. 3, a turbine rotor 68 is rotatably mounted between a forward segmented stator assembly 70 and a rear segmented stator assembly 72. Rotor 68 includes a turbine blade 74 attached to a blade disk 76 which drives shaft 78 in a known fashion.

A segmented turbine shroud 80 of generally conventional construction is mounted to combustor casing 82 via annular shroud support 84. As seen in FIG. 4 and as discussed above, an axially-extending gap 18 is provided between each pair of stator segments 86. A similar gap exists between each pair of adjoining shroud segments 10 and stator segments 88.

The stator segments 86 and 88 are arranged in a spaced circumferential array in a known manner similar to that of the segmented shroud 80. Gap or clearance 18 is bounded by confronting edge faces 14 on each adjoining stator segment 86 as seen in FIG. 4. As seen in FIGS. 3 and 5, an axial gap 24 is provided for axial clearance between each shroud segment 10 and each annular stator segment 86.

In order to prevent cooling air from entering the exhaust gas flowpath 15 from the cooling air flowpath 92 through clearance gaps 18 and 24, a pair of forward and aft sealing assemblies 94, 96 is provided in accordance with one embodiment of the invention. Details of the forward sealing assembly 94 are shown in FIGS. 4 and 5 and are substantially the same as the details of the aft sealing assembly 96.

Spline seals 16 are mounted within slots in edge faces 14 of each stator segment 86 to seal across gaps 18 as described previously. A pair of axially abutting brush seals 50, 50a is mounted within a recess 98 formed in each end of the shroud support 84. The brush seals 50, 50a are retained axially by an annular retaining clip 100 as well as by arcuate projections or flanges 102 formed on each stator segment 86. The brush seal casings 52 are dimensioned to engage recess 98 with an air tight press fit. In this manner, clearance gaps 18 and 24 are effectively sealed.

There has been disclosed heretofore the best embodiment of the invention presently contemplated. However, it is to be understood that various changes and modifications may be made thereto without departing from the spirit of the invention.

What is claimed is:

1. A relatively static seal assembly for a turbine engine, comprising:
   an annular segmented turbine engine assembly comprising a plurality of arcuate segments arranged in a circumferentially spaced array;
   first seal means provided between said segments; and
   brush seal means at least partially engaging said first seal means to form a seal therewith, said brush seal means being arranged to maintain said seal during thermal growth variations between said first seal means and said brush seal means.

2. The seal assembly of claim 1, wherein said first seal means comprises a plurality of axially-extending spline seals each formed of a thin metal strip.

3. The seal assembly of claim 1, wherein said annular segmented turbine assembly comprises a turbine nozzle.

4. The seal assembly of claim 1, wherein said annular segmented turbine assembly comprises a turbine shroud assembly.

5. The seal assembly of claim 1, wherein said arcuate segments comprise sealing surface portions and wherein said brush seal means engages said sealing surface portions of said arcuate segments.

6. The seal assembly of claim 3, wherein said sealing surface portions comprise as cast surface portions.

7. The seal assembly of claim 1, wherein said arcuate segments comprise seal support means for supporting said second seal means.

8. The seal assembly of claim 7, wherein said seal support means comprises radial lip means provided on said arcuate segments.

9. The seal assembly of claim 1, further comprising stationary annular frame means disposed adjacent to said seal assembly and wherein said second seal means is sealingly mounted to said frame means.

10. The seal assembly of claim 2, wherein each of said spline seals comprises an axial end portion contacting said second seal means.

11. The seal assembly of claim 10, wherein said axial end portion terminates in contact with said second seal means.

12. The seal assembly of claim 10, wherein said axial end portion extends beneath and past said second seal means.

13. A seal assembly for a turbine engine, comprising:
   an annular segmented turbine engine assembly comprising a plurality of arcuate segments arranged in a circumferentially spaced array;
   first seal means provided between said segments; and
   a one-piece annular brush seal at least partially engaging said first seal means to form a seal therewith.

14. A seal assembly for a turbine engine having a frame element, comprising:
   an annular segmented turbine engine assembly spaced apart from said frame element and comprising a plurality of arcuate segments arranged in a circumferentially spaced array;
   first seal means mounted between said segments; and
   brush seal means mounted to said frame element and at least partially engaging said first seal means to form a seal therewith.

* * * * *